United States Patent
Cai

(10) Patent No.: US 12,397,583 B2
(45) Date of Patent: Aug. 26, 2025

(54) WHEEL ROTATION SPEED MEASUREMENT ASSEMBLY AND WHEEL HUB DRIVING SYSTEM

(71) Applicant: Schaeffler Technologies AG & Co. KG, Herzogenaurach (DE)

(72) Inventor: Xiangyang Cai, Kunshan (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 227 days.

(21) Appl. No.: 18/018,299

(22) PCT Filed: Jul. 16, 2021

(86) PCT No.: PCT/CN2021/106847
§ 371 (c)(1),
(2) Date: Jan. 27, 2023

(87) PCT Pub. No.: WO2022/028231
PCT Pub. Date: Feb. 10, 2022

(65) Prior Publication Data
US 2023/0294454 A1    Sep. 21, 2023

(30) Foreign Application Priority Data
Aug. 7, 2020  (CN) .................... 202010788769.X

(51) Int. Cl.
*G01P 3/44*      (2006.01)
*B60B 27/00*     (2006.01)
*B60K 7/00*      (2006.01)

(52) U.S. Cl.
CPC ........ *B60B 27/0068* (2013.01); *B60B 27/001* (2013.01); *G01P 3/44* (2013.01);
(Continued)

(58) Field of Classification Search
CPC .................................................. B60B 27/0068
(Continued)

(56) References Cited

U.S. PATENT DOCUMENTS 3,934,685 A    1/1976   Jovick
6,135,571 A *  10/2000  Mizukoshi ............ F16C 33/768
                                                301/124.1

FOREIGN PATENT DOCUMENTS

CN    104081073    3/2017
CN    104385900    4/2017
(Continued)

OTHER PUBLICATIONS

Sueshige et al. Machine Translation of FR-2795145-A1. Published Dec. 2000. Accessed Nov. 2024. (Year: 2000).*

*Primary Examiner* — Walter L Lindsay, Jr.
*Assistant Examiner* — Philip T Fadul
(74) *Attorney, Agent, or Firm* — Volpe Koenig

(57) ABSTRACT

A wheel rotation speed measurement assembly and a wheel hub driving system. The assembly includes a wheel hub bearer, a synchronous shaft and a compiler. The wheel hub bearer has a central shaft and an outer ring. The central shaft is hollow with an inner cavity and forms a torsion-resistant connection with a vehicle suspension. The outer ring can be driven to rotate relative to the central shaft, and forms a torsion-resistant connection with the wheel hub. The synchronous shaft is arranged in the inner cavity and has an end that is close to the first end has a torsion-resistant connection with the outer ring. The compiler is mounted at an end of the synchronous shaft away from the first end. The assembly has a simple structure and can measure the wheel rotation speed directly. Rotation speed output by this compact wheel hub driving system can be accurately measured.

19 Claims, 3 Drawing Sheets

(52) U.S. Cl.
CPC ......... *B60B 27/0015* (2013.01); *B60K 7/0007* (2013.01); *B60K 2007/0038* (2013.01)

(58) Field of Classification Search
USPC ...................................................... 73/115.08
See application file for complete search history.

(56) References Cited

FOREIGN PATENT DOCUMENTS

| | | | | |
|---|---|---|---|---|
| CN | 209870094 U | 12/2019 | | |
| FR | 2659450 | 3/1990 | | |
| FR | 2795145 A1 * | 12/2000 | ........... | F16D 41/064 |
| GB | 1163039 | 9/1969 | | |
| WO | 2020066834 A1 | 4/2020 | | |

* cited by examiner

20

10

40

40

WHEEL ROTATION SPEED MEASUREMENT ASSEMBLY AND WHEEL HUB DRIVING SYSTEM

CROSS-REFERENCE TO RELATED APPLICATIONS

This application is the U.S. National Phase of PCT Appln. No. PCT/CN2021/106847, filed Jul. 16, 2021, which claims the benefit of Chinese Patent Appln. No. 202010788769.X, filed Aug. 7, 2020, the entire disclosures of which are incorporated by reference herein.

TECHNICAL FIELD

The disclosure relates to a wheel hub driving system, and also relates to a wheel rotation speed measurement assembly in the wheel hub driving system for measuring wheel rotation speed.

BACKGROUND

Wheel hub driving is a way to drive a vehicle electrically. Generally, the wheel hub driving system integrates both a drive assembly and a brake assembly on an inner side of a wheel rim, wherein the drive assembly comprises a drive motor, a gear reducer and a wheel hub bearer.

FIG. 1 is a schematic diagram of a possible wheel hub driving system comprising a drive motor W1, a reducer W2, a wheel hub bearer W3 and a brake W4. The torque from the drive motor W1 is transmitted to the wheel hub bearer W3 through the reducer W2, and a flange portion of an outer ring of the wheel hub bearer W3 is connected with the wheel hub through a bolt W5 so at to further transmit the torque to a wheel. The rotation speed of the wheel rim is the same as that of the wheel.

Due to the limited space between the wheel hub driving system and the wheel rim, it is difficult to arrange a sensor to directly measure the wheel rotation speed. Therefore, in general, the wheel rotation speed can generally only be measured indirectly. For example, the wheel rotation speed is calculated by measuring the rotation speed of the drive motor W1 with an angle sensor.

Indirect measurement may present problems such as low signal accuracy and delay in signal transmission, and thus, there may be a large error between the obtained wheel rotation speed and the actual rotation speed, which poses a threat to the safety of the wheel hub driving system.

SUMMARY

The objective of the present disclosure is to provide a wheel rotation speed measurement assembly and a wheel hub driving system in order to overcome or at least alleviate the above-mentioned shortcomings existing in the prior art.

According to a first aspect of the present disclosure, a wheel rotation speed measurement assembly is provided, which is used for measuring the rotation speed of a wheel driven by a wheel hub driving system, the wheel rotation speed measurement assembly comprising a wheel hub bearer, a synchronous shaft and a compiler, wherein the wheel hub bearer comprises a central shaft and an outer ring; the central shaft is a hollow shaft having a through inner cavity in an axial direction, and the central shaft is used for forming a rotationally-fixed connection with a vehicle suspension;

the outer ring is sleeved at a first end of the central shaft, the outer ring can be driven by an electric motor of the wheel hub driving system to rotate relative to the central shaft, and the outer ring is used for forming a rotationally-fixed connection with a wheel hub;

the synchronous shaft is arranged in the inner cavity, and an end of the synchronous shaft that is close to the first end has a rotationally-fixed connection with the outer ring; and the compiler is mounted at an end of the synchronous shaft that is away from the first end, and the compiler can be identified by a sensor so as to measure the rotation speed of the wheel.

In at least one embodiment, the measurement assembly further comprises a synchronous cover; the synchronous cover is mounted at an end of the outer ring in such a manner that it is rotationally-fixed relative to the outer ring, and the synchronous shaft has a rotationally-fixed connection with the synchronous cover.

In at least one embodiment, a side of the synchronous cover facing the inner cavity is formed with a connecting groove, an end of the synchronous shaft facing the synchronous cover forms a connecting portion, and the connecting portion extends into the connecting groove, and thus the synchronous cover together with the synchronous shaft can rotate relative to the central shaft.

In at least one embodiment, the measurement assembly further comprises a bracket, the bracket is provided with a center hole and is of an annular shape; the bracket is arranged in the inner cavity and has a rotationally-fixed connection with the central shaft, the synchronous shaft passes through the center hole, and the synchronous shaft is supported by the bracket in a radial direction.

In at least one embodiment, bearings are arranged between the synchronous shaft and an inner circumferential wall of the bracket.

In at least one embodiment, the synchronous shaft is provided with shaft shoulders, the inner circumferential wall of the bracket is provided with annular positioning portions which are radially and outwardly recessed, and the bearings are arranged between the shaft shoulders and the positioning portions.

In at least one embodiment, two bearings are provided, and the two bearings are arranged at two ends of the bracket in the axial direction.

In at least one embodiment, the bearings are sliding bearings lubricated with grease or having a self-lubricating function.

In at least one embodiment, the measurement assembly further comprises a tail cover, and the tail cover is mounted on an end of the central shaft that is away from the first end so as to close the inner cavity.

According to a second aspect of the disclosure, a wheel hub driving system is provided, comprising a drive motor and a reducer, and also comprising a wheel rotation speed measurement assembly according to the present disclosure.

A rotor of the drive motor has a rotationally-fixed connection with an input end of the reducer, and the outer ring of the wheel hub bearer of the wheel rotation speed measurement assembly has a rotationally-fixed connection with an output end of the reducer.

The wheel rotation speed measurement assembly according to the present disclosure has a simple structure and is capable of measuring the wheel rotation speed directly.

Rotation speed output by the wheel hub driving system according to the present disclosure can be accurately measured, and the wheel hub driving system is compact in size.

DETAILED DESCRIPTION

Exemplary embodiments of the present disclosure will be described below with reference to the drawings. It should be understood that the specific description is only used to teach those skilled in the art how to implement the disclosure and is neither intended to be exhaustive of all possible variations of the present disclosure nor to limit the scope of the present disclosure.

Figure 1:
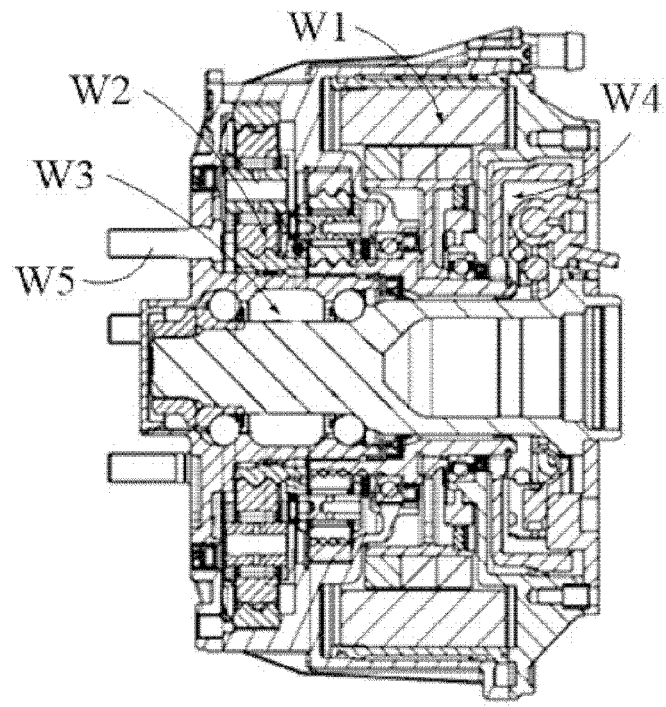
FIG. 1 is a schematic diagram of a possible wheel hub driving system.
Figure 2:
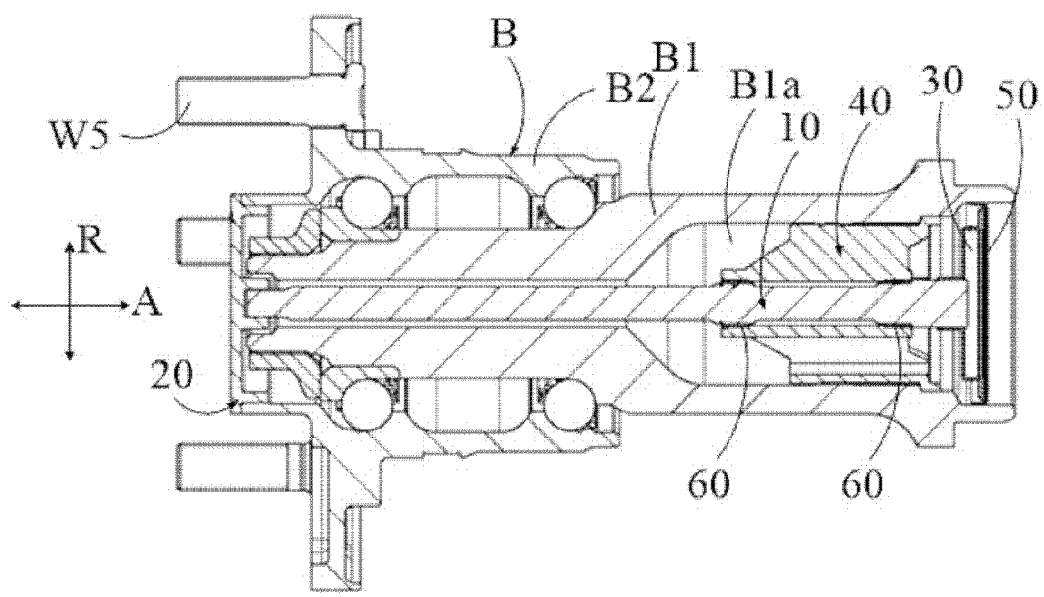
FIG. 2 is a sectional view of a wheel rotation speed measurement assembly in an axial direction according to one embodiment of the present disclosure.
Figure 3:
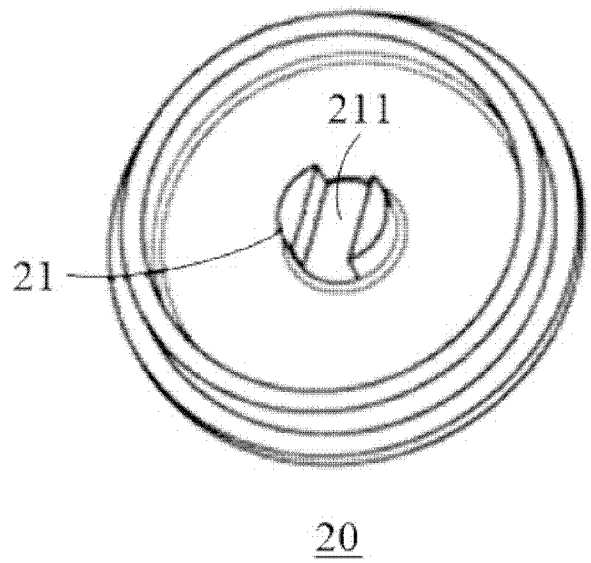
FIG. 3 is a schematic diagram of a synchronous cover of a wheel rotation speed measurement assembly according to one embodiment of the present disclosure.
Figure 4:
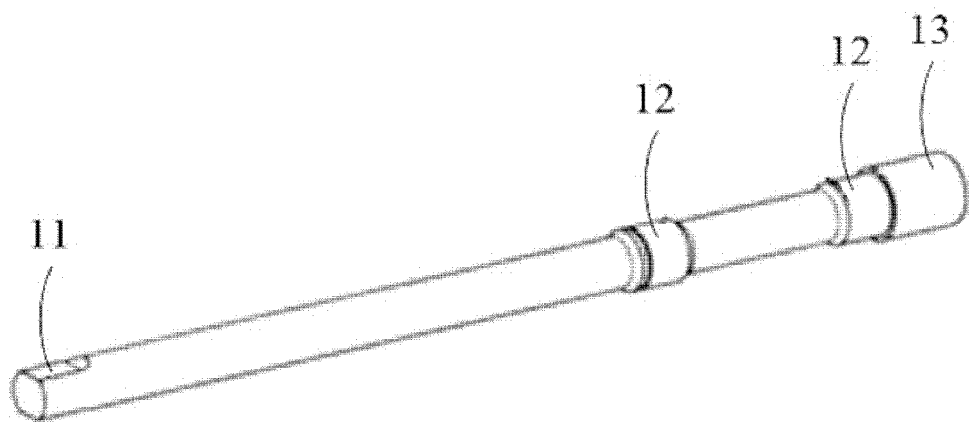
FIG. 4 is a schematic diagram of a synchronous shaft of a wheel rotation speed measurement assembly according to one embodiment of the present disclosure.
Figure 5:
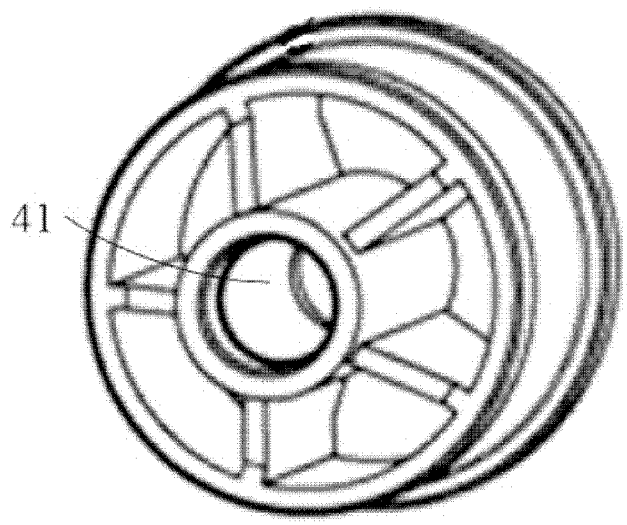
FIG. 5 is a schematic diagram of a bracket of a wheel rotation speed measurement assembly according to one embodiment of the present disclosure.
Figure 6:
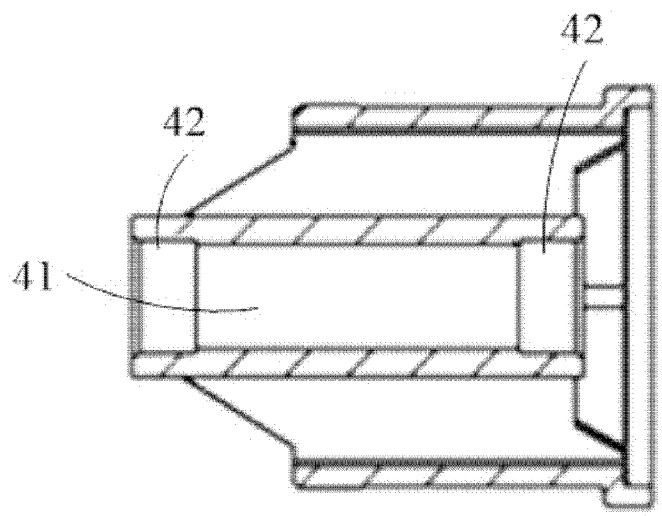
FIG. 6 is a sectional view of FIG. 5 along an axial direction.

Unless otherwise specified, referring to FIG. 2, A represents an axial direction of a wheel rotation speed measurement assembly, and the axial direction A is consistent with the axial direction of a wheel hub bearer B in the wheel rotation speed measurement assembly; and R represents a radial direction of the wheel rotation speed measurement assembly, and the radial direction R is consistent with the radial direction of the wheel hub bearer B in the wheel rotation speed measurement assembly.

The wheel rotation speed measurement assembly according to the present disclosure will be described with reference to FIGS. 2 to 6. The wheel rotation speed measurement assembly is a part of a wheel hub driving system and is used for measuring the rotation speed of a wheel driven by the wheel hub driving system.

In this embodiment, the wheel rotation speed measurement assembly comprises a wheel hub bearer B, a synchronous shaft 10, a synchronous cover 20, a compiler 30, a bracket 40, a tail cover 50 and bearings 60.

The wheel hub bearer B comprises a central shaft B1, an outer ring B2 and rolling bodies arranged between the central shaft B1 and the outer ring B2.

The central shaft B1 is a hollow shaft penetrating in the axial direction A. The central shaft B1 is fixed to a housing of the wheel hub driving system, and the housing is fixed to a vehicle suspension, or in other words, the central shaft B1 has a torsion-resistant (rotationally-fixed) connection with the vehicle suspension.

The outer ring B2 is sleeved at one end of the central shaft B1 and can rotate relative to the central shaft B1. The outer ring B2 is used for connecting a wheel hub and an output end of a reducer (not shown) so that the torque from a drive motor (not shown) of the wheel hub driving system can be transmitted to a wheel hub through the reducer and the outer ring B2 in sequence. In the axial direction A, the length of the outer ring B2 is smaller than that of the central shaft B1. For the convenience of description below, the end of the central shaft B1 where the outer ring B2 is located is referred to as a first end of the central shaft B1.

In this embodiment, an outer circumference of the outer ring B2 that is near the first end in the axial direction A has a flange portion protruding outward in the radial direction R, and the wheel hub (not shown) can be connected to the flange portion by a bolt W5.

Preferably, in order to facilitate the axial positioning of the rolling body and the outer ring B2 on the central shaft B1, the outer diameter of a section of the central shaft B1 in the axial direction A and close to the first end is smaller than that of a section of the central shaft B1 away from the first end.

The synchronous cover 20 is mounted at an end of the outer ring B2 that is close to the first end of the central shaft B1, and the synchronous cover 20 has a torsion-resistant connection with the outer ring B2 (for example, by means of a threaded connection or connecting in an interference fit manner).

A side wall of the synchronous cover 20 facing the inner cavity B1a of the central shaft B1 is provided with a connecting stand 21 protruding toward the inner cavity B1a. A middle portion of the connecting stand 21 is recessed to form a connecting groove 211. The connecting groove 211 is used for connecting the synchronous shaft 10 to be further described below.

The synchronous cover 20 achieves the function of connecting the synchronous shaft 10 and the outer ring B2 as well as sealing the wheel hub bearer B at the end, thereby preventing pollutants such as splashing waste water from entering the interior of the wheel hub bearer B.

The synchronous shaft 10 is arranged in the inner cavity B1a of the central shaft B1. One end of the synchronous shaft 10 and the synchronous cover 20 are connected at the connecting groove 211 in a torsion-resistant manner. Specifically, this end of the synchronous shaft 10 forms a connecting portion 11 having a special cross-sectional shape, and the cross-sectional shape of the connecting portion 11 is the same as that of the connecting groove 211.

In this embodiment, the cross section of the connecting portion 11 that is perpendicular to the axial direction A is of a waist shape, which is formed, for example, by cutting the end of the synchronous shaft 10 along the axial direction. The distance between two plane portions of the waist shape is approximately equal to the width of the connecting groove 211, so that the connecting portion 11 can extend into the connecting groove 211 and closely fit with the side wall of the connecting groove 211. It should be understood that the cross sections of the connecting portion 11 and the connecting groove 211 may also have other shapes, and the present disclosure is not limited thereto.

In this way, the synchronous cover 20 together with the synchronous shaft 10 can rotate synchronously, and because the synchronous cover 20 and the outer ring B2 rotate synchronously, and the wheel and the outer ring B2 rotate synchronously, the rotation of the synchronous shaft 10 is synchronous with the wheel.

An end of the synchronous shaft 10 that is away from the connecting portion 11 is provided with the compiler 30, which has a torsion-resistant connection with the synchronous shaft 10. The above-mentioned end is away from the outer ring B2 and a wheel rim, so there is enough space to arrange the compiler 30, and a sensor for detecting a rotation signal of the compiler 30 can be conveniently arranged on the nearby vehicle suspension. The rotation speed of the compiler 30 measured by the sensor is the rotation speed of the wheel.

In this embodiment, the compiler 30 is annular, an end of the synchronous shaft 10 that is away from the connecting portion 11 is provided with a compiler mounting portion 13 having a large outer diameter, and the annular compiler 30 is sleeved on the compiler mounting portion 13. The compiler 30 is press-fitted with the compiler mounting portion 13 by means of interference fit or is mounted thereon by way of threaded connection.

In order to stably support the synchronous shaft 10, the bracket 40 is arranged in the inner cavity B1a and has a torsion-resistant connection with the central shaft B1.

The bracket 40 is annular, and an outer circumferential wall of the bracket 40 forms an interference fit with an inner circumferential wall of the synchronous shaft 10 defining the inner cavity B1a.

The synchronous shaft 10 passes through the center hole 41 of the bracket 40, and the bearings 60 are arranged between the inner circumferential wall of the bracket 40 and the synchronous shaft 10. Preferably, the bearings 60 are sliding bearings.

In this embodiment, there are two bearings 60, which are respectively arranged at two axial ends of the bracket 40. An axial region of the synchronous shaft 10 for mounting the bearings 60 forms shaft shoulders 12, and the inner circumferential wall of the bracket 40 forms two annular positioning portions 42 radially and outwardly recessed at both axial ends. Inner rings of the bearings 60 are mounted on the shaft shoulders 12, and outer rings of the bearings 60 are mounted on the positioning portions 42.

Preferably, in order to facilitate the mounting of the bracket 40, a portion of the central shaft B1 that is away from the first end has a larger inner diameter, that is, a portion of the inner cavity B1a where the bracket 40 is mounted has a larger inner diameter, so that the inner cavity B1a forms a shape having a big end and a small end.

The end of the central shaft B1 that is away from the first end is provided with the tail cover 50, and the tail cover 50 is used for closing the inner cavity B1a at this end, thereby preventing pollutants such as splashing waste water from entering the inner cavity B1a, or even further passing through the inner cavity B1a to flow to the first end of the central shaft B1 and enter the interior of the wheel hub bearer B. In this embodiment, the tail cover 50 is embedded in the inner circumferential wall of the central shaft B1.

It is inconvenient to replenish lubricant to the bearings 60 as the inner cavity B1a is closed by two covers, so the bearings 60 are preferably lubricated with grease, or are preferably those having a self-lubricating function.

It should be understood that the sensor for sensing the signal of the compiler 30 can be arranged outside the central shaft B1, for example, being mounted on the vehicle suspension. This sensor may or may not be a part of the wheel rotation speed measurement assembly of the present application.

The disclosure has at least one of the following advantages:
(i) The wheel rotation speed measurement assembly according to the present disclosure is capable of directly measuring the rotation speed of the wheel, and the acquired signal of the rotation speed is direct and reliable.
(ii) The compiler 30 is accommodated in the closed inner cavity B1a and is not susceptible to contamination and damage.
(iii) The compiler 30 may be a conventional compiler for the sensor for measuring the rotation speed.
(iv) The wheel rotation speed measurement assembly according to the present disclosure effectively utilizes an internal space of the wheel hub driving system and does not need to occupy an extra space of the original wheel hub driving system.

Naturally, the present disclosure is not limited to the above-mentioned embodiments, and a person skilled in the art could make various modifications to the above-mentioned embodiments of the present disclosure under the teaching of the present disclosure without departing from the scope of the present disclosure.

LIST OF REFERENCE NUMERALS

W1 Drive motor;
W2 Reducer;
W3 Wheel hub bearer;
W4 Brake;
W5 Bolt;
B Wheel hub bearer;
B1 Central shaft;
B1a Inner cavity;
B2 Outer ring;
10 Synchronous shaft;
11 Connecting portion;
12 Shoulder;
13 Compiler mounting portion;
20 Synchronous cover;
21 Connecting stand;
211 Connecting groove;
30 Compiler;
40 Bracket;
41 Center hole;
42 Positioning portion;
50 Tail cover;
60 Bearing.

The invention claimed is:

1. A wheel rotation speed measurement assembly for measurement of a rotation speed of a wheel driven by a wheel hub driving system, the wheel rotation speed measurement assembly comprising:
a wheel hub bearer;
a synchronous shaft;
a compiler;
the wheel hub bearer comprises a central shaft and an outer ring, the central shaft is a hollow shaft having a penetrating inner cavity in an axial direction, the central shaft is used for forming a rotationally-fixed connection with a vehicle suspension;
the outer ring is sleeved at a first end of the central shaft, the outer ring is driveable by an electric motor of the wheel hub driving system to rotate relative to the central shaft, the outer ring forms a rotationally-fixed connection with a wheel hub;
the synchronous shaft is arranged in the inner cavity, an end of the synchronous shaft that is closer to the first end has a rotationally-fixed connection with the outer ring;
and the compiler is mounted at an end of the synchronous shaft that is away from the first end, and the compiler is detected by a sensor in order to measure the rotation speed of the wheel.

2. The wheel rotation speed measurement assembly according to claim 1, further comprising a synchronous cover mounted at an end of the outer ring rotationally-fixed relative to the outer ring, and the synchronous shaft has a rotationally-fixed connection with the synchronous cover.

3. The wheel rotation speed measurement assembly according to claim 2, wherein, a side of the synchronous cover facing the inner cavity is formed with a connecting groove; an end of the synchronous shaft facing the synchronous cover forms a connecting portion; and the connecting portion extends into the connecting groove such that the synchronous cover together with the synchronous shaft are rotatable relative to the central shaft.

4. The wheel rotation speed measurement assembly according to claim 1, further comprising a bracket having a center hole therein and having an annular shape, the bracket is arranged in the inner cavity and has a rotationally-fixed connection with the central shaft, the synchronous shaft passes through the center hole and the synchronous shaft is supported by the bracket in a radial direction.

5. The wheel rotation speed measurement assembly according to claim 4, wherein a bearing is arranged between the synchronous shaft and an inner circumferential wall of the bracket.

6. The wheel rotation speed measurement assembly according to claim 5, wherein the synchronous shaft includes shaft shoulders; the inner circumferential wall of the bracket is provided with annular positioning portions which are radially and outwardly recessed; and the bearing is arranged between the shaft shoulders and the positioning portion.

7. The wheel rotation speed measurement assembly according to claim 6, wherein two of the bearings are provided; and the two bearings are arranged at two ends of the bracket in the axial direction.

8. The wheel rotation speed measurement assembly according to claim 7, wherein the bearings are sliding bearings lubricated with grease or are self-lubricating.

9. The wheel rotation speed measurement assembly according to claim 1, further comprising a tail cover mounted on an end of the central shaft that is away from the first end that closes the inner cavity.

10. A wheel hub driving system, comprising:
a drive motor, a reducer, and the wheel rotation speed measurement assembly according to claim 1, and a rotor of the drive motor has a rotationally-fixed connection with an input end of the reducer, and the outer ring of the wheel hub bearer of the wheel rotation speed measurement assembly has a rotationally-fixed connection with an output end of the reducer.

11. A wheel rotation speed measurement assembly for measurement of a rotation speed of a wheel driven by a wheel hub driving system, the wheel rotation speed measurement assembly comprising:
a wheel hub bearer including a central shaft and an outer ring, the central shaft is a hollow shaft having a penetrating inner cavity that extends in an axial direction, the central shaft is configured to form a rotationally-fixed connection with a vehicle suspension;
the outer ring is rotatably mounted at a first end of the central shaft, the outer ring is driveable by an electric motor of the wheel hub driving system to rotate relative to the central shaft and forms a rotationally-fixed connection with a wheel hub;
a synchronous shaft arranged in the inner cavity, an end of the synchronous shaft that is closer to the first end has a rotationally-fixed connection with the outer ring;
a compiler mounted at an end of the synchronous shaft that is away from the first end, and the compiler is configured to be detected in order to measure the rotation speed of the wheel.

12. The wheel rotation speed measurement assembly according to claim 11, further comprising a synchronous cover mounted at an end of the outer ring rotationally fixed relative to the outer ring, and the synchronous shaft has a rotationally-fixed connection with the synchronous cover.

13. The wheel rotation speed measurement assembly according to claim 12, wherein a side of the synchronous cover facing the inner cavity is formed with a connecting groove, an end of the synchronous shaft facing the synchronous cover includes a connecting portion, and the connecting portion extends into the connecting groove such that the synchronous cover together with the synchronous shaft are rotatable relative to the central shaft.

14. The wheel rotation speed measurement assembly according to claim 11, further comprising a bracket having a center hole therein and having an annular shape, the bracket is arranged in the inner cavity and has a rotationally-fixed connection with the central shaft, the synchronous shaft passes through the center hole and the synchronous shaft is supported by the bracket in a radial direction.

15. The wheel rotation speed measurement assembly according to claim 14, wherein a bearing is arranged between the synchronous shaft and an inner circumferential wall of the bracket.

16. The wheel rotation speed measurement assembly according to claim 15, wherein the synchronous shaft includes shaft shoulders, the inner circumferential wall of the bracket is provided with annular positioning portions which are radially and outwardly recessed, and the bearing is arranged between the shaft shoulders and the positioning portion.

17. The wheel rotation speed measurement assembly according to claim 16, wherein two of the bearings are provided, and the two bearings are arranged at two ends of the bracket in the axial direction.

18. The wheel rotation speed measurement assembly according to claim 17, wherein the bearings are sliding bearings lubricated with grease or are self-lubricating.

19. The wheel rotation speed measurement assembly according to claim 11, further comprising a tail cover mounted on an end of the central shaft that faces away from the first end that closes the inner cavity.

* * * * *